United States Patent

Iwai et al.

Patent Number: 6,045,233
Date of Patent: Apr. 4, 2000

[54] LIGHT GUIDING DEVICE

[75] Inventors: Yuji Iwai, Kanagawa; Hideyuki Taguchi, Tokyo, both of Japan

[73] Assignee: Sony Corporation, Tokyo, Japan

[21] Appl. No.: 09/003,441

[22] Filed: Jan. 6, 1998

[30] Foreign Application Priority Data

Jan. 9, 1997 [JP] Japan ..................................... 9-002272

[51] Int. Cl.[7] .............................. G01D 11/28; G02B 6/00
[52] U.S. Cl. .............................. 362/26; 362/30; 362/551; 116/202
[58] Field of Search ..................................... 362/551, 555, 362/558, 576, 26, 582, 29, 30, 560, 31; 116/202

[56] References Cited

U.S. PATENT DOCUMENTS 5,515,244   5/1996   Levins ........................................ 362/32

*Primary Examiner*—Sandra O'Shea
*Assistant Examiner*—Bryan P Stanley
*Attorney, Agent, or Firm*—Jay H. Maioli

[57] ABSTRACT

It is made possible to locate arbitrarily a light guiding device and a light emitting means. A notch (11) having a triangular cross-section is formed on a bottom (inner) side of a light guiding device (10) formed so as to have a rectangular cross-section. Furthermore, a light emitting source (12) is provided under the notch (11) of this light guiding device (10). The light emitting source (12) is mounted on a circuit board (13), and controlled according to the state of control or setting in, for example, the electronic appliance. When the light ray from the light emitting source (12) is irradiated toward the notch (11), the emitted light ray is reflected by a reflective face (14) formed by the notch (11) so as to be a plane and a front face (15) of the light guiding device (10) becomes luminous. In addition, the irradiated light ray is partially transmitted through the reflective face (14), and a top face (16) of the light guiding device (10) also becomes luminous. As a result, the two outer faces (15) and (16) become luminous.

7 Claims, 5 Drawing Sheets

LIGHT GUIDING DEVICE

BACKGROUND OF THE INVENTION

The present invention relates to a light guiding apparatus suitable for use in an indicator or the like for indicating the state of control and setting in, for example, electronic appliances.

In an indicator of, for example, an electronic appliance, a light ray supplied from a light emitting means such as a light emitting diode (LED) and so on is emitted from an outer casing of the device to the outside to indicate the state of control or setting in, for example, the electronic appliance for the outside. In that case, a light guiding device 40 as shown in, for example, FIGS. 1A and 1B is used in conventional devices.

In the examples shown in FIGS. 1A and 1B, the light guiding device 40 is formed by molding transparent, or milky white colored, light transmitting resin in a pillar form. One end of the light guiding device 40 faces the outside from an aperture 42 formed through an outer casing 41 of the device. In front of the other end of the light guiding device 40, a light emitting means 43 is disposed and controlled according to the state of control or setting in, for example, the electronic appliance.

When the light emitting means 43 is lighted in this device by a control signal supplied from the circuit board 44, its light ray is incident on the other end of the light guiding device 40, propagated through the inside of the light guiding device 40, and emitted from the one end of the light guiding device 40. In other words, when the light emitting means 43 is lighted, the one end of the light guiding device 40 inserted in the aperture 42 of the outer casing 41 of the device is lighted. Thereby, the state of the control or setting in, for example, the electronic appliance is indicated to the outside.

In this light guiding device, the circuit board 44 is typically disposed horizontally within the outer casing 41 of the appliance, and the aperture 42 is formed in the front face of the outer casing 41. In order to provide the light emitting means 43 in front of the other end of the above described light guiding device 40, therefore, a LED forming the light emitting means 43 is raised from the circuit board 44 by using a holder 45, for example, and disposed at a desired position as shown in FIG. 1A.

In this method, however, an extra part such as the holder 45 or the like is needed. Due to the increased numbers of parts and increased assembly workings, a problem of an increase in cost is posed. Alternatively, vertical disposition of the circuit board 44 as shown in FIG. 1B is also conducted. However, a space for disposing the circuit board 44 vertically is needed. For an appliance desired to be especially thin, the vertical disposition of the circuit board 44 cannot be adopted.

The above described indicator is sometimes required to effect indication on both the front face and the top face of the appliance. For example, a control panel 50 incorporating therein a control means for manually controlling the power on/off, channel up/down, and tone volume increase/ decrease, an indicator for indicating their control and setting states as one body or the like is disposed on a so-called bezel portion or the like of an outer frame of a display face of a television set as shown in FIG. 2.

As shown in FIG. 3, the control panel 50 includes, for example, a group of switches such as a power on/off switch 52, a channel up/down switch 53, a tone volume increase/ decrease switch 54, an input selection switch 55 and an input setting switch 56 or the like, and a group of indicators such as a power on indicator 57 and an indicator 58 indicating input setting or the like. In addition, statements 59 indicating contents of such control/setting switches and so on are also described thereon.

And in the control panel 50, indications of the indicators 57 and 58 are conducted on two faces, i.e., the front face and the top face of the control panel 50. In the case where such indicators 57 and 58 conducting the indication on the two faces are to be formed, various light guiding devices 70 as shown in FIGS. 4A to 4D, for example, have been used in the conventional appliance.

The light guiding device 70 shown in FIG. 4A is formed so as to have a nearly pentagonal cross-section. By making a light ray from a light emitting means 71 incident to a bottom face a of the light guiding device 70 toward a vertex b, two faces c and d having the vertex b sandwiched therebetween become luminous. In this configuration, however, a holder 72 for disposing the light emitting means 71 toward the vertex b or the like is needed. Due to an increase in the number of parts and so on, a problem of an increase in cost is posed.

The light guiding device 70 shown in FIG. 4B is formed so as to have a rectangular cross-section. By making light rays from light emitting means 71e and 71f incident respectively to two inner faces e and f of the light guiding device 70, two outer faces g and h thereof become luminous. In this configuration, however, two light emitting means 71e and 71f, the holder 72 and the like are needed. In this case as well, a problem of an increase in cost caused by an increase in the number of parts is posed.

In FIG. 4C, a notch h having a triangular cross-section is formed on a top face g side of the light guiding device 70 formed so as to have a rectangular cross-section. By making a light ray from the light emitting means 71 incident to a bottom face i of the light guiding device 70, the incident light ray is reflected by a face j of the notch and therefore a front face k becomes luminous. In addition, the light ray is transmitted through the face j and a top face g also becomes luminous. Thus, the two outer faces g and k each become luminous.

In this structure, however, forming the notch h on the top face g of the light guiding device 70 causes a change in design on the outer side of the device. In other words, the notch h on the top face g of the light guiding device 70 is formed on the outside of the device. Therefore, it is necessary to alter the outer design of the device so as to take this notch h into consideration.

In FIG. 4D, curved faces m and n are formed on the light guiding device 70. A light ray from the light emitting means 71 is made incident to the light guiding device 70 from its bottom face p, reflected by these curved faces m and n, and thereby guided to a front face q and a top face r of the light guiding device 70. The faces q and r thus become luminous. However, this structure has a problem that, in particular, the light emission on the top face r is not favorable. This structure has also a problem that the volume of the light guiding device 70 itself becomes large and installation thereof is not easy.

SUMMARY OF THE INVENTION

In view of these points, the present invention has been made. An object of the present invention is to eliminate the problems of the conventional device that the location of the light guiding device and the light emitting means is restricted, the installation of them is not easy, and an extra part or the like, and a change in the design of the device are needed for installing them.

In accordance with the present invention, therefore, a light ray from a light emitting means is reflected by a reflective face formed by molding resin so as to have a flat face and emitted to a desired one or more faces. As a result, the location of the light guiding device and the light emitting means can be arbitrarily set, whereby the installation of the light guiding device and the light emitting means is facilitated.

In other words, the light guiding device according to the present invention is molded from resin, and has a reflective face formed by molding the resin so as to have a flat face, in which a light ray from the light emitting means is reflected by the reflective face to be emitted to a desired face or more faces.

In the conventional device, the location of the light guiding device and the light emitting means is restricted, the installation thereof is not easy, and an extra part or the like and a change in the design of the device are needed for installing the same. The present invention can easily eliminate these problems.

DESCRIPTION OF THE PREFERRED EMBODIMENT

Figure 1A:
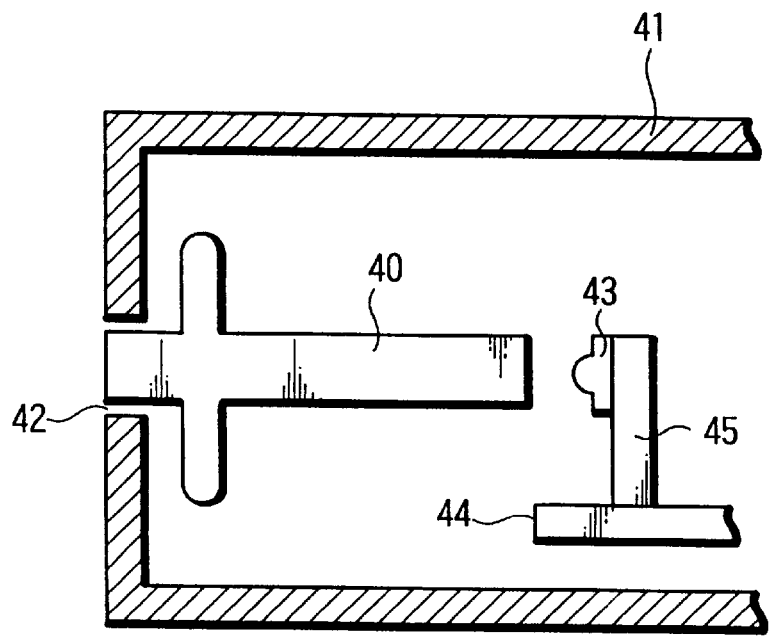
FIGS. 1A and 1B are configuration diagrams showing conventional light guiding devices, respectively.
Figure 1B:
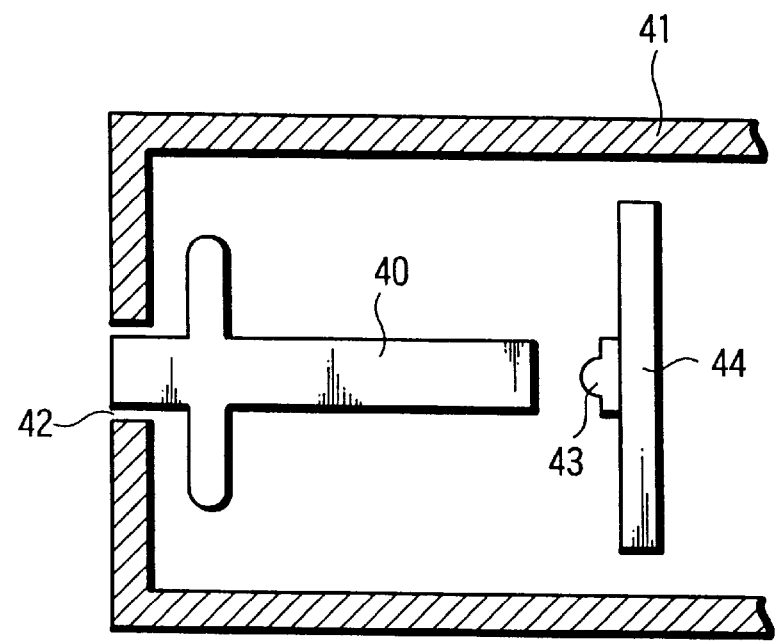
Figure 2:
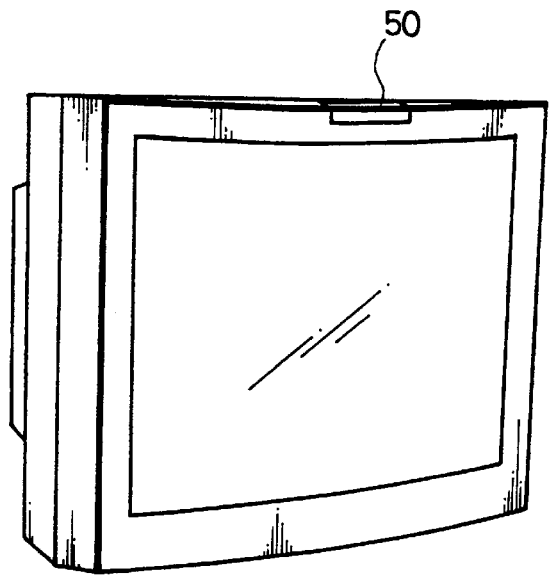
FIG. 2 is a perspective view used for explaining a television receiver.
Figure 3:
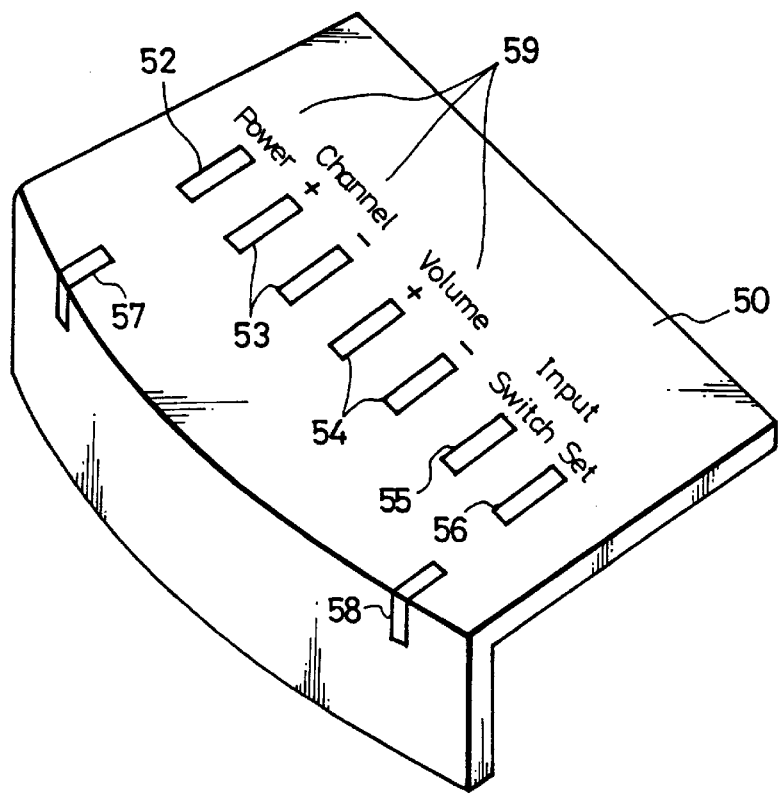
FIG. 3 is a perspective view used for explaining a control panel shown in FIG. 2.
Figure 4A:
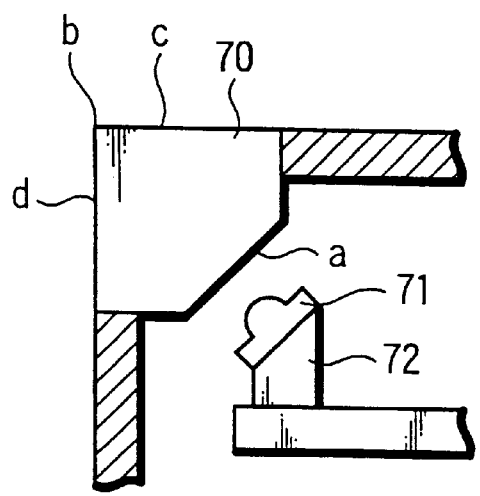
FIGS. 4A to 4D are configuration diagrams showing conventional light guiding devices, respectively.
Figure 4B:
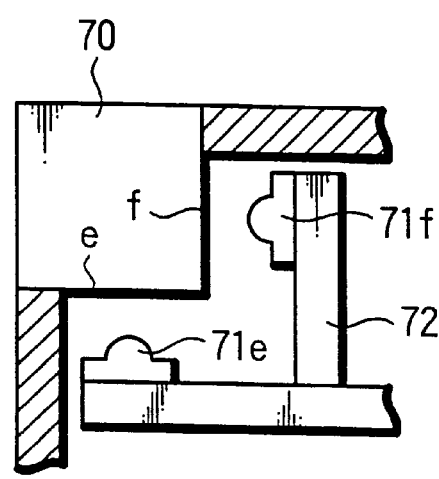
Figure 4C:
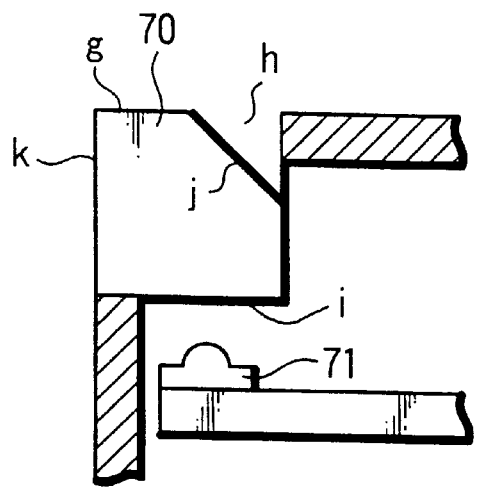
Figure 4D:
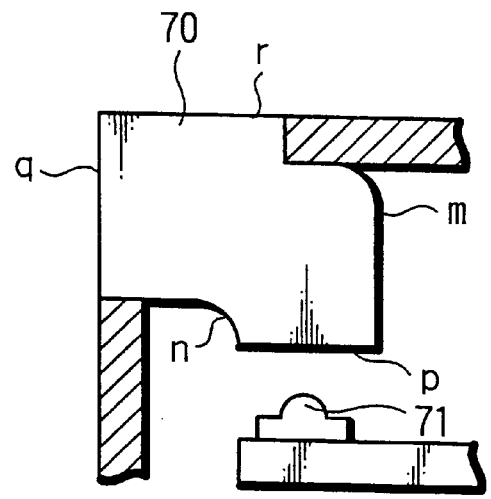
Figure 5:
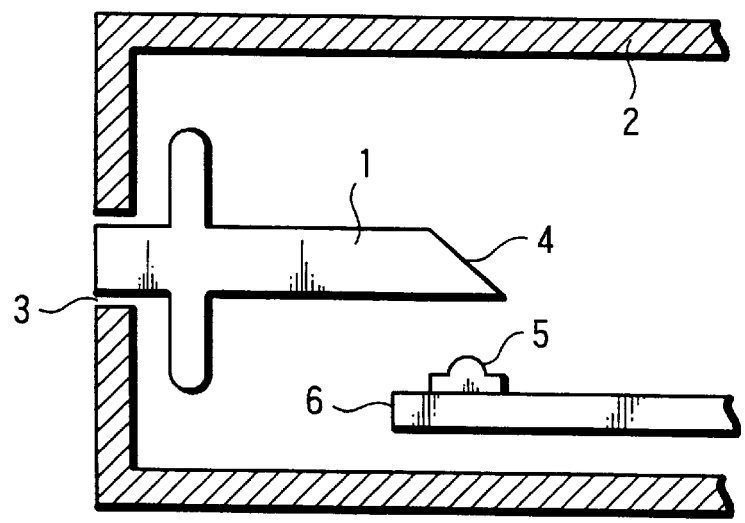
FIG. 5 is a configuration diagram showing an example of a light guiding device to which the present invention is applied.

Hereafter, the present invention will be described with reference to the drawings. FIG. 5 is a configuration diagram showing an example of an indicator of an electronic appliance to which a light guiding device according to the present invention has been applied. In the example of FIG. 5, a structure of the case where an indicator is provided on the front face of the appliance is shown.

With reference to FIG. 5, a light guiding device 1 in this example is obtained by molding transparent resin, or milk white light transmitting resin in a pillar form. One end of the light guiding device 1 faces the outside from an aperture 3 formed through an outer casing 2 of the appliance. Furthermore, the other end of the light guiding device 1 is formed so as to have, for example, a plane 4 having an angle of 45 degrees with respect to an axis of the above described pillar portion thereof. Just below this plane 4, a light emitting means 5 is disposed. This light emitting means 5 is mounted on a circuit board 6, and controlled according to the state of control or setting in, for example, the electronic appliance.

When the light emitting means 5 is lighted in this device by a control signal supplied from the circuit board 6, its light ray is made incident to the light guiding device 1 from its portion just under the other end thereof, totally reflected by the plane 4, and guided therethrough along the axis of its pillar portion. Furthermore, the light ray thus guided is emitted from the one end of the light guiding device 1. In other words, when the light emitting means 5 is lighted, the one end of the light emitting device 1 facing the aperture 3 of the outer casing 2 of the appliance becomes luminous. Thereby, the state of the control or setting in, for example, the electronic appliance is indicated to the outside.

Specifically, in the light guiding device, the light emitting means 5 can be provided, for example, just below the other end of the light guiding device 1. As a result, the light emitting means 5 can be directly attached to the circuit board 6, for example. It becomes unnecessary to provide an extra holder or a circuit board and the like. Therefore, the space and cost can be prevented from increasing. In addition, the location of the light guiding device 1 and the light emitting means 5 can be arbitrarily determined, and the degree of freedom of the design of the appliance and the layout of the circuit board 6 can be expanded.

In this device, the light ray from the light emitting means is reflected by a reflective face formed by molding resin so as to have a plane, and emitted from one or more desired faces. As a result, the location of the light guiding device and the light emitting means can be effected arbitrarily, and the light guiding device and the light emitting means can be installed easily.

In the conventional device, the location of the light guiding device and the light emitting means is restricted, the installation of them is not easy, and an extra part or the like and a change in the design of the device are needed for installing same. The present invention can easily eliminate these problems.

Figure 6:
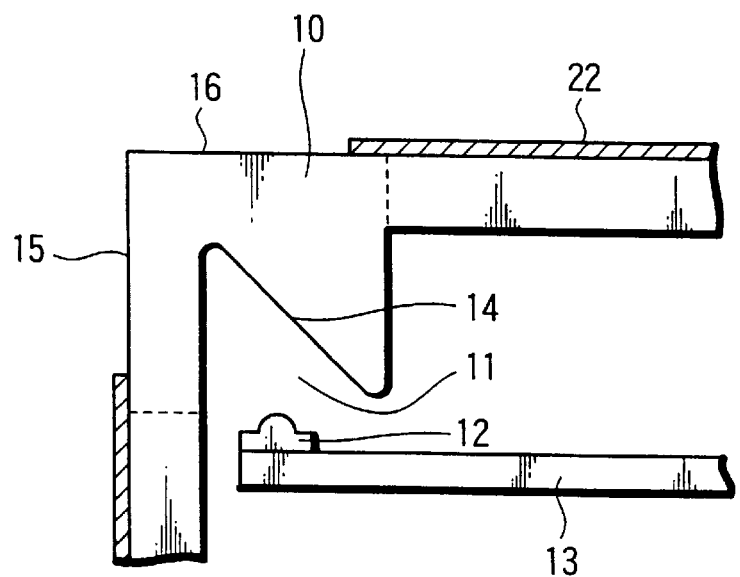
FIG. 6 is a configuration diagram showing another example of the light guiding device to which the present invention is applied.

Further, FIG. 6 is a configuration diagram showing another example of an indicator of an electronic appliance to which a light guiding device according to the present invention has been applied. In the example of FIG. 6, a structure of the case where the indication of the indicator is effected on two faces, i.e., the front face and the top face of the device is shown.

With reference to FIG. 6, a notch 11 having a triangular cross-section is formed on a bottom (inner) side of a light guiding device 10 molded from resin so as to have a rectangular cross-section. Furthermore, a light emitting means 12 is disposed below the notch 11 of the light guiding device 10. The light emitting means 12 is mounted on a circuit board 13, and controlled according to the state of control or setting in, for example, the electronic appliance.

When a light ray from the light emitting means 12 is emitted toward the notch 11, the emitted light ray is reflected by a reflective face 14 formed by the notch 11 so as to be a plane so that a front face 15 of the light guiding device 10 becomes luminous, and also, the emitted light ray is partially transmitted through the reflective face 14 with the result that a top face 16 of the light guiding device 10 also becomes luminous. As a result, the two outer faces 15 and 16 become luminous, respectively.

According to this structure, therefore, since the notch 11 is formed on the bottom (inner) side of the light guiding device 10, a change is not caused in the design of the outer side of the appliance. In other words, the top face side and the front face side of the light guiding device 10 serving as the outer side of the appliance remain unchanged as before. In the design of the outer side of the appliance, it thus becomes completely unnecessary to pay special regard caused by the shape of the indicator.

If in the case of this device the above described control panel 50, for example, is molded by injection molding, the above described light guiding device 10 is molded integrally therewith and the indicators 57 and 58, and the like on the control panel 50 can be formed by applying or depositing an arbitrary pigment to a surface other than the two luminous faces 15 and 16.

In the case where a pigment is to be melt-deposited on the surface of, for example, the control panel 50, the pigment is provided on an arbitrary film so as to form a desired shape by printing or the like. Then, to this film, arbitrary resin is injected. Thereby, the injection molding of the resin is conducted. At the same time, the pigment provided on the film is melt-deposited on the surface of the molded resin with the desired shape.

Figure 7:
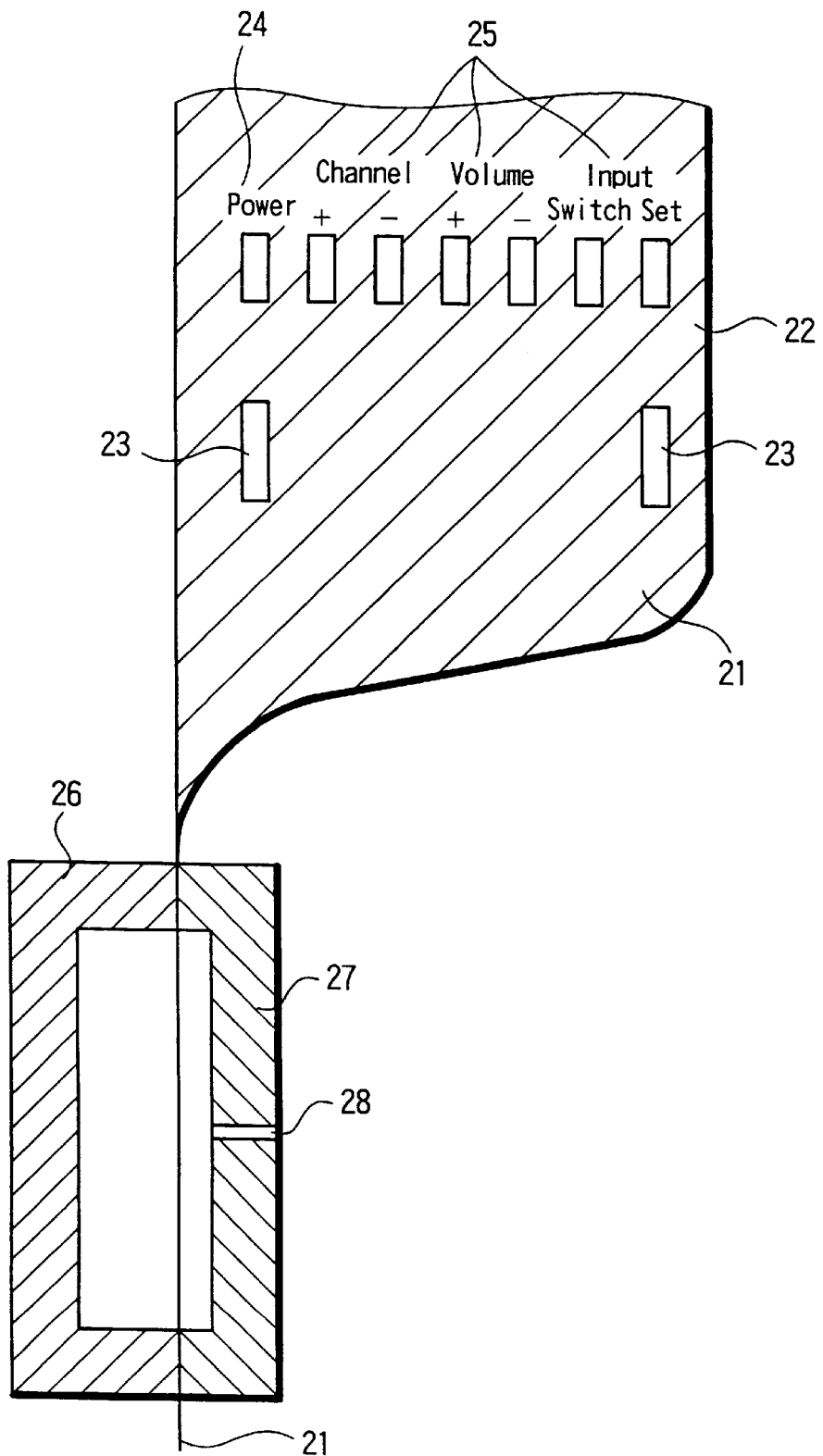
FIG. 7 is a diagram used for explaining a molding process thereof.

On an arbitrary film 21, an arbitrary pigment 22 forming the entire surface of the control panel 50 is formed by printing or the like as shown in FIG. 7, for example. Except portions 23 of this pigment 22 corresponding to the above described indicators 57 and 58, the printing or the like is conducted. Furthermore, characters 24 using a green pigment to represent the statement 59 of, for example, "POWER" and characters 25 using a white pigment to represent other statements are formed by printing or the like.

Then, when this film 21 is gripped between metal molds 26 and 27 for molding the part and an arbitrary resin or the like is injected through an injection aperture 28, the part is molded, and simultaneously the above described arbitrary pigment 22 and the characters 24 and 25 using the green and white pigments are melt-deposited on the surface of the part. According to this method, therefore, the pigment 22 is melt-deposited on the entire surface of the part, and the pigment 22 is removed at the positions of the above described indicators 57 and 58 corresponding to the portions 23. Thus favorable indication can be conducted.

The light guiding device according to the present invention is formed as described by molding only transparent or milky white colored light transmitting resin, and has a reflective face obtained by molding the resin so as to have a plane to reflect thereon the light ray emitted from the light emitting means to be emitted from one or more faces, the light guiding device and the light emitting means can be arbitrarily located and easily installed.

Having described a preferred embodiment of the invention with reference to the accompanying drawings, it is to be understood that the invention is not limited to the precise embodiment and that various changes and modifications could be effected therein by one skilled in the art without departing from the spirit or scope of the invention as defined in the appended claims.

What is claimed is:

1. A light guiding device for emitting a light ray produced by light emitting means from an inside of an outer casing of an appliance to an outside thereof and formed by molding a resin, said light guiding device comprising:

a reflective face formed by molding said resin so as to have a flat face, and wherein said light ray from said light emitting means is reflected by said reflective face in a direction of one or more desired faces, wherein said reflective face partially reflects said light ray from an outside of said resin, and wherein said light ray emitted from said light emitting means is partially reflected by said reflective face when directed on said reflective face and emitted to a plurality of said desired faces.

2. The light guiding device according to claim 1, wherein said resin comprises one of a transparent and milk-white colored light transmitting resin.

3. The light guiding device according to claim 1, wherein said reflective face forms an angle of 45 degrees.

4. The light guiding device according to claim 1, wherein said reflective face reflects said light ray from an inside of said resin due to a difference in a refractive index between said resin and an outside of said resin, and wherein said light ray emitted from said light emitting means is directed to said inside of said resin through an arbitrary face of said resin, said directed light ray is reflected by said reflective face and emitted to said one or more desired faces.

5. The light guiding device according to claim 1, wherein said resin is molded in a pillar form, and said light guiding device has one end facing said outside through an aperture formed in said outer casing of said appliance and another end having said reflective face.

6. The light guiding device according to claim 1, wherein said light guiding device is integrally molded with said outer casing of said appliance.

7. A light guiding device for emitting a light ray produced by light emitting means from an inside of an outer casing of an appliance to an outside thereof and formed by molding a resin, said light guiding device comprising:

a reflective face formed by molding said resin so as to have a flat face, and wherein said light ray from said light emitting means is reflected by said reflective face in a direction of one or more desired faces, wherein said light guiding device is formed so as to have a rectangular cross-section with a triangular cross-section notch on a bottom face thereof.

* * * * *